Patented Jan. 5, 1954

2,665,219

UNITED STATES PATENT OFFICE 2,665,219

CERAMIC MATERIAL

Hans Thurnauer and Maurice A. Murray, Chattanooga, Tenn., assignors to American Lava Corporation, Chattanooga, Tenn., a corporation of Tennessee No Drawing. Application November 22, 1949,
Serial No. 128,931

6 Claims. (Cl. 106—46)

This invention relates to ceramic material, and has for an object the provision of a ceramic material which is an effective electrical insulator, is chemically resistant, and has high mechanical strength and resistance to abrasion.

Another object of the invention is to provide a ceramic material employing aluminum oxide as its base material and possessing the above properties, which can be vitrified at a temperature of about 1400° C.

Aluminum oxide has excellent electrical, chemical and mechanical properties which particularly suit it for many applications. Customarily it is mixed with clay and small amounts of fluxes, such as talc and calcium carbonate, and fired to vitrification. The difficulty is that such alumina bodies vitrify at relatively high temperatures between 1600° and 1900° C., and firing to this high temperature is an expensive and difficult operation, due not only to the high fuel consumption, but to the necessity of lining the kilns with special refractories which are short-lived at such high temperatures. Attempts have therefore been made to arrive at alumina compositions which can be vitrified at lower temperatures and yet retain the excellent properties of the high firing temperature alumina bodies. One such is covered by Schaeffer Patent No. 2,419,290 which discloses that by adding an alkaline earth phosphate as a flux to a mixture of aluminum oxide and clay, it is possible to vitrify a body with an aluminum oxide content as high as 88.74% at approximately 1450° C. While undoubtedly an excellent material for spark plug insulators, for which Schaeffer intends it, such material is of poor acid resistance and thus of little or no value where such resistance is an important consideration.

The present invention is directed to a composition containing aluminum oxide or alumina as its base material or principal ingredient which, while possessing exceptional electrical, chemical and mechanical properties, can be vitrified at a temperature of 1400° C. or cone 14 with an alumina content as high as 87.5%. This is obtained by the addition to a mixture of alumina and clay of a novel combination of fluxes. These fluxes are mixtures of the oxides of cobalt, calcium, magnesium, lithium and titanium, which are added to the alumina and clay as calcium titanate, lithium carbonate, magnesium fluoride and cobaltic oxide. Alternatively, other flux materials may be employed which will produce the same chemical composition in the final product. Thus, for example, it is possible to replace calcium titanate with calcium carbonate and titanium dioxide.

While the customary ball and china clays may be added to aluminum oxide or alumina to provide the plasticity necessary for forming the material into bodies of the desired shape by plastic methods, it is permissible to substitute for the clay equivalent amounts of alumina and silica and, if necessary, use non-plastic methods of forming. In either case, in the composition of the present invention, a particular proportion of aluminum oxide to clay or its equivalent is maintained, regardless of the percentage content of these materials and the fluxes. This proportion is substantially 78 parts of aluminum oxide to 19 parts of clay. With this limitation, the permissible range of the several ingredients is as follows:

| | Per cent |
|---|---|
| Aluminum oxide | 79.5 –73.2 |
| Clay | 19.35–17.8 |
| Total fluxes | 1.15– 9 |

Including the aluminum oxide content of the clay, the above range will bring the maximum total alumina content to the aforementioned 87.5%.

The proportions of the several fluxes within the above permissible range of total flux content can be varied as follows:

| | Per cent |
|---|---|
| Cobaltic oxide | .05–2 |
| Calcium titanate | 1 –5 |
| Lithium carbonate | .05–1 |
| Magnesium fluoride | .05–1 |

A typical composition within the prescribed limits is the following:

| | Per cent |
|---|---|
| Aluminum oxide | 78 |
| Cobaltic oxide | .05 |
| Ball clay | 14.2 |
| China clay | 4.8 |
| Calcium titanate | 2.8 |
| Lithium carbonate | .1 |
| Magnesium fluoride | .05 |
| | 100.00 |

A body having the chemical composition of the ceramic material of the present invention can be prepared by known ceramic methods. It is preferable to pre-grind the fluxing ingredients together with the clay in a pebble mill to form a homogeneous slip and add to this slip previously ground aluminum oxide. Another suitable method is to grind the fluxes and clay, and, after drying, to mix them with aluminum oxide in the dry condition. To work the material into the desired shapes, well-known methods of dry pressing, extrusion or casting can be used. Preforms can also be machined into the desired shapes by working the body either in leather-hard, semi-moist or dry condition. After forming, the body can be fired in production kilns and vitrified at a temperature of about 1400° C. or cone equivalent 14.

A body formed in the above manner has, as previously mentioned, excellent chemical resistance which particularly suits it for applications where this factor is of importance, such as the wear-resistant guides in textile manufacture, which are normally referred to as "thread guides." As illustrative of the excellent mechanical and electrical properties which the material additionally possesses, it has a specific gravity of 3.38, a water absorption of 0%, a hardness of 9 on Mohs' scale, a linear coefficient of thermal expansion per degree centigrade of $3.3 \times 10^{-6}$ between 25 and 100° C., and $7.5 \times 10^{-6}$ between 25 and 700° C. Its compressive and flexural strengths are, respectively, 150,000 and 45,000 lbs. per sq. in. and its resistance to impact is 7 in. lbs. It also has a low thermal conductivity of approximately .02. Among its electrical properties, its dielectric strength is 300 volts per mil, dielectric constant is 7.9, power and loss factors .004 and .031, respectively, and capacity change per degree centigrade+160 parts per million.

From the above detailed description, it will be apparent that there has been provided an improved ceramic material, having alumina as its principal ingredient, which possesses excellent properties and can be fired at commercially practicable temperatures. It should be understood that the described embodiment is merely exemplary of the invention and that all modifications are intended to be included which depart neither from the spirit of the invention nor the scope of the appended claims.

Having described our invention, we claim:

1. A ceramic material made by firing at a temperature of approximately 1400° C. a mixture composed of from 73.2–79.5% alumina, from 17.8–19.35% clay, from .05–2% cobaltic oxide, from 1–5% calcium titanate, from .05–1% lithium carbonate, and from .05–1% magnesium fluoride.

2. A ceramic material made by firing a mixture of from 73.2–79.5% alumina, from 17.8–19.35% clay, from .05–2% cobaltic oxide, from 1–5% calcium titanate, from .05–1% lithium carbonate, and from .05–1% magnesium fluoride.

3. A ceramic material of oxide composition made by firing a mixture composed of at least 73.2% alumina, 17.8% clay, and as fluxes in compound form .05% of each of cobalt, lithium and magnesium and 1% of calcium and titanium.

4. A ceramic material of oxide composition made by firing a mixture composed of at least 73.2% alumina, clay, and as fluxes in compound form at least .05% of each of cobalt, lithium and magnesium and 1% of calcium and titanium, the ratio of alumina to clay in said mixture being maintained at substantially 78:19.

5. A ceramic material of oxide composition containing at maximum 87.5% alumina and made by firing a mixture composed of at least 73.2% alumina, 17.8% clay, and as fluxes in compound form .05% of each of cobalt, lithium and magnesium and 1% of calcium and titanium.

6. A ceramic material of oxide composition containing at maximum 87.5% alumina and made by firing at a temperature of about 1400° C. a mixture composed of at least 73.2% alumina, 17.8% clay, and as fluxes in compound form .05% of each of cobalt, lithium and magnesium and 1% of calcium and titanium.

HANS THURNAUER.
MAURICE A. MURRAY.

References Cited in the file of this patent

UNITED STATES PATENTS

| Number | Name | Date |
|---|---|---|
| 1,818,506 | Ross et al. | Aug. 11, 1931 |
| 2,413,441 | Feichter | Dec. 31, 1946 |
| 2,427,454 | Heany | Sept. 16, 1947 |
| 2,482,580 | Feichter | Sept. 20, 1949 |